(No Model.)

R. H. SOULE.
STEAM TRAP.

No. 421,775. Patented Feb. 18, 1890.

WITNESESS:
Darwin S. Wolcott
F. E. Gaither.

INVENTOR,
Richard H. Soule
by George H. Christy
Att'y.

UNITED STATES PATENT OFFICE.

RICHARD H. SOULE, OF PITTSBURG, PENNSYLVANIA, ASSIGNOR TO THE STANDARD CAR HEATING AND VENTILATING COMPANY, OF SAME PLACE.

STEAM-TRAP.

SPECIFICATION forming part of Letters Patent No. 421,775, dated February 18, 1890.

Application filed August 30, 1889. Serial No. 322,429. (No model.)

*To all whom it may concern:*

Be it known that I, RICHARD H. SOULE, a citizen of the United States, residing at Pittsburg, in the county of Allegheny and State of Pennsylvania, have invented or discovered certain new and useful Improvements in Steam-Traps, of which improvements the following is a specification.

It frequently happens in the class of steam-traps having its outlet-valve controlled by a float that the water remaining in the trap is frozen, thereby preventing any movement of the float and outlet-valve and rendering the trap inoperative.

The object of the invention herein is to provide means whereby the ice formed in the trap may be melted, so as to release and permit of the proper movements of the valve and its float.

In general terms the invention consists in the construction and combination of mechanical devices or elements, all as more fully hereinafter described and claimed.

Figure 1:
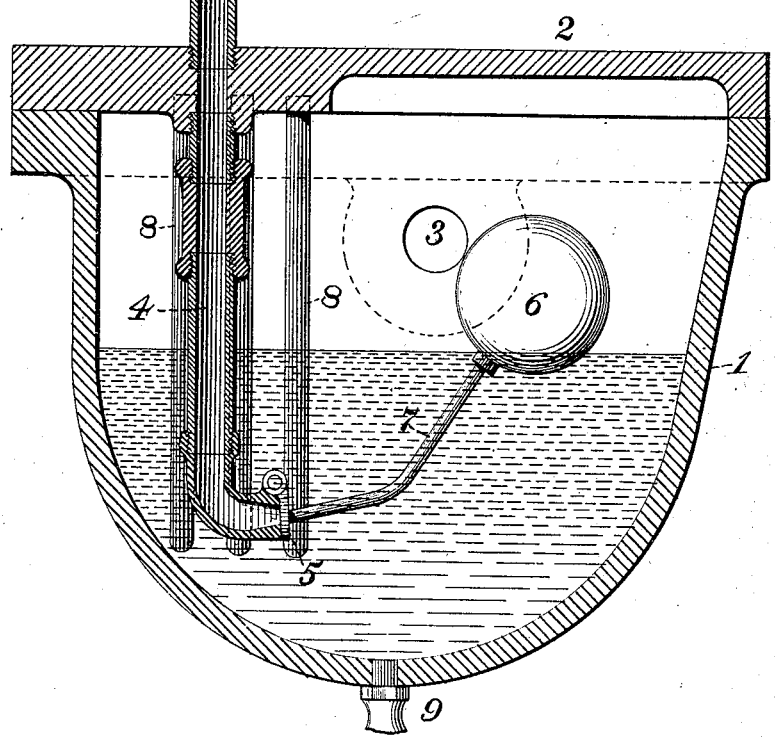
Figure 2:
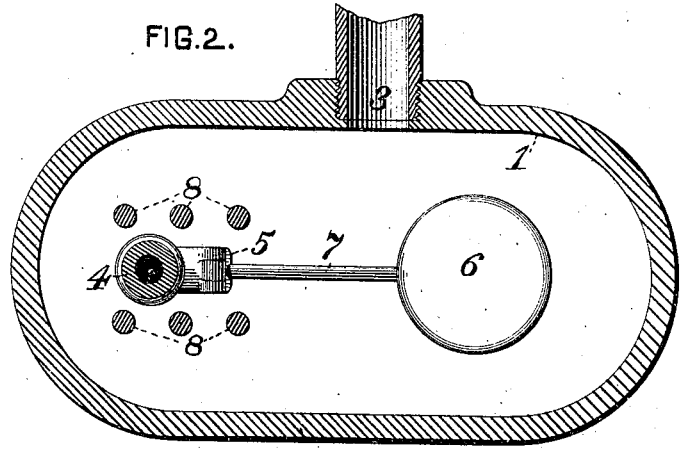

In the accompanying drawings, forming a part of this specification, Figure 1 is a sectional elevation of a trap embodying my invention, and Fig. 2 is a sectional plan view of the same.

The trap 1, which may be of any ordinary or suitable construction, is preferably formed with a removable top plate 2, and is provided with an inlet 3 and with an outlet-pipe 4, extending down nearly to the bottom of the trap, as shown. At its lower end this pipe 4 is provided with a valve 5, controlling the outflow from the trap, and to said valve is attached a float 6 by means of a rod 7 or any other suitable device. As the water of condensation collects in the trap the float 6 is raised, thereby opening the valve and permitting the water to be drawn or forced out of the trap. In cold weather, if the trap is not drained through the pipe 4, the water will freeze, thereby preventing the action of the valve and float until the ice is melted, and the steam alone acting on the surface of the ice will not effect a rapid melting of the ice. I therefore secure to the top of the trap one or more heating conducting-rods 8, which extend down below the level of the valve. The expansion of the water in freezing in the trap will raise the float and partially open the valve, so that as soon as an opening through the ice is formed by the heating of the rods by the steam the pressure exerted by the latter will force the water through the pipe, thus permitting the steam to pass below the ice, and, acting on both surfaces thereof, effect a rapid melting. As it frequently happens that the water in the trap is frequently frozen solid, I prefer to employ a series of rods 8, arranging them around the valve and pipe, as shown in Fig. 2, so that the ice at that point may be rapidly melted, affording access to the partially-opened valve and the passage of the steam and water therethrough, as is necessary in any heating or other system where a circulation of the steam is required. It will be readily understood that the rods 8, extending from the top of the trap or any part thereof above the normal water-line, will be heated by the steam and will conduct the heat down into and through the ice. While preferring to arrange the rods around the outlet-valve, as shown, they may be arranged in any other suitable manner, it only being necessary that portions of each rod should be in the steam-space above the normal water-level and portions below the same. While preferring to form these rods 8 of copper, as possessing a high conductivity, rods of any other suitable material may be employed.

I am aware that a pipe for conducting live steam has been arranged in steam-traps for the purpose of thawing any ice which may be formed therein; but I am not aware that heat-conducting rods have ever been so arranged as to be heated by the steam entering the trap in the normal operation thereof and by conduction melting the ice, so as to permit of free escape of water of condensation.

I claim herein as my invention—

1. A steam-trap provided with an inlet and outlet, in combination with one or more heat-conducting rods extending above and below the normal water-level, whereby the heat of the steam entering the trap through its normal inlet may be conducted through the ice formed in said trap, substantially as set forth.

2. A steam-trap provided with an inlet and a valved outlet, in combination with a series of heat-conducting rods arranged around the valved outlet and extending above and below the normal water-level, whereby the heat of the steam entering the trap through its normal inlet may be conducted through the ice formed in said trap, substantially as set forth.

In testimony whereof I have hereunto set my hand.

RICHARD H. SOULE.

Witnesses:
DARWIN S. WOLCOTT,
WILLIAM BEAL.